(12) United States Patent
Ettorre et al.

(10) Patent No.: US 7,577,184 B2
(45) Date of Patent: Aug. 18, 2009

(54) MEMORY-BASED DEVICE AND METHOD OF CHANNEL ESTIMATION IN A DIGITAL COMMUNICATION RECEIVER

(75) Inventors: Donato Ettorre, Turin (IT); Maurizio Graziano, Turin (IT); Bruno Melis, Turin (IT); Andrea Finotello, Turin (IT); Alessandro Ossoli, Turin (IT); Alfredo Ruscitto, Turin (IT)

(73) Assignees: Telecon Italia S.p.A., Milan (IT); STMicroelectronics S.R.L., Agrate Brianza (IT)

( * ) Notice: Subject to any disclaimer, the term of this patent is extended or adjusted under 35 U.S.C. 154(b) by 681 days.

(21) Appl. No.: 10/534,996

(22) PCT Filed: Nov. 15, 2002

(86) PCT No.: PCT/EP02/12815

§ 371 (c)(1),
(2), (4) Date: Sep. 27, 2005

(87) PCT Pub. No.: WO2004/047328

PCT Pub. Date: Jun. 3, 2004

(65) Prior Publication Data
US 2006/0133456 A1 Jun. 22, 2006

(51) Int. Cl.
*H04B 1/00* (2006.01)

(52) U.S. Cl. .................................................. 375/147
(58) Field of Classification Search ......... 375/147–148, 375/340, 342–343, 347, 349, 130, 150; 455/132, 455/137, 134; 370/350
See application file for complete search history.

(56) References Cited

U.S. PATENT DOCUMENTS 5,715,276 A 2/1998 Tran et al.

(Continued)

FOREIGN PATENT DOCUMENTS

JP 2000138651 10/1998

(Continued)

OTHER PUBLICATIONS

"A Flexible Rake Receiver . . . " by Lasse et al. (Third IEEE Signal Processing Workshop Mar. 2001).

(Continued)

*Primary Examiner*—Khanh C Tran
(74) *Attorney, Agent, or Firm*—Andrew Wilford

(57) ABSTRACT

A spread spectrum digital communication receiver, of the type comprising an input memory buffer (16) for storing samples of an input signal (y(k)) and a code generator circuit (30) for generating a re-generated user code, incorporates a device (24) for the estimation of a channel delay profile comprises: a basic correlator (32) having a first input (41) for sequentially reading from a memory location of the input memory buffer (16) a plurality of samples of the input signal (y(k)), a second input (43) for receiving from the code generator circuit (30) a re-generated user code, and an output terminal for generating, by means of a correlation operation between the plurality of samples of the input signal and the regenerated user code, a first value of the channel delay profile energy (DP(1)); and a memory controller circuit (36) for addressing said the memory buffer (16) so that the first input (41) of the basic correlator (32) is successively fed with the content of several memory locations of the memory buffer (16), each addressing operation corresponding to a new correlation operation of the basic correlator (32) for the computation of a new value of the channel delay profile energy (DP(1)).

16 Claims, 5 Drawing Sheets

U.S. PATENT DOCUMENTS

| | | | |
|---|---|---|---|
| 5,768,306 | A | 6/1998 | Sawahashi et al. |
| 6,178,193 | B1 * | 1/2001 | Kondo .......................... 375/130 |
| 6,381,229 | B1 * | 4/2002 | Narvinger et al. ........... 370/328 |
| 6,459,883 | B2 * | 10/2002 | Subramanian et al. ... 455/67.11 |
| 6,580,750 | B2 * | 6/2003 | Aue ........................... 375/150 |
| 6,694,496 | B2 * | 2/2004 | Goslin et al. ................... 716/4 |
| 6,731,622 | B1 * | 5/2004 | Frank et al. ................. 370/342 |
| 7,016,653 | B2 * | 3/2006 | Tsunehara et al. ............ 455/69 |
| 7,103,095 | B2 * | 9/2006 | Papasakellariou ........... 375/150 |
| 2002/0181628 | A1 * | 12/2002 | Iochi et al. .................. 375/347 |

FOREIGN PATENT DOCUMENTS

| | | |
|---|---|---|
| JP | 2000244378 | 9/2000 |
| JP | 2002232322 | 2/2001 |
| WO | WO-9507577 | 9/1994 |

OTHER PUBLICATIONS

"Microcellular Direct Sequence Spread-Spectrum . . ." by Grob et al. IEEE Journal on Selected Areas in Communications (Jun. 1990).

"Theory of Spread-Spectrum Communictions . . ." by Pickholtz et al. (IEEE Transactions May 1982).

* cited by examiner

MEMORY-BASED DEVICE AND METHOD OF CHANNEL ESTIMATION IN A DIGITAL COMMUNICATION RECEIVER

CROSS REFERENCE TO RELATED APPLICATIONS

This application is the US national phase of PCT application PCT/EP2002/012815 filed 15 Nov. 2002 with a claim to the priority of PCT patent application PCT/EP2002/012815 itself filed 15 Nov. 2002.

FIELD OF THE INVENTION

The present invention refers to telecommunication systems and in particular to a digital receiver for use in a CDMA (Code Division Multiple Access) system. The invention also relates to a device and a method for the estimation of the channel delay profile in a digital communication receiver.

The CDMA access technique currently finds widespread use in third generation mobile communication systems (e.g. UMTS, CDMA2000) thanks to its higher spectrum efficiency with respect to other access techniques.

In a CDMA system the data sequence is spread by a pseudo noise code (hereinafter "PN code") having a broader spectrum width. The efficiency of these systems is highly dependent on the capability of the receiver to continuously maintain precise phase synchronization between the received and the locally generated PN code.

In fact, without a precise phase synchronization between the received and the locally generated code, the performance loss of the receiver is in the order of several dB, in terms of signal to noise and interference ratio (SNIR), even for a mismatch of half of the chip period.

The phase synchronisation process is usually accomplished in two steps: code acquisition and code tracking. Code acquisition is the initial search process that brings the phase of the locally generated code to within the chip duration ($T_C = 1/F_C$) of the incoming code. Code tracking is the process of achieving and maintaining fine alignment of the chip boundaries between the incoming and locally generated codes.

In particular the present invention is concerned with the code acquisition procedure.

A CDMA receiver is usually implemented in the form of a Rake receiver collecting the signal energy from different multipath components and coherently combining their contributions. Basically, the Rake receiver consists of many independent receiving units named 'fingers', each tuned to a different replica of the transmitted signal. The Rake receiver works properly only if the time delays and amplitudes of the different multi-path components are correctly estimated.

Within the functional modules of a Rake receiver it is therefore necessary to consider a particular module that estimates the time delays and amplitudes of the different multi-path components of the incoming signal. The detection of the multipath components, or briefly 'path detection', affects the capacity of CDMA systems since false detections or missing detections increase the transmission power required to get the desired Quality of Service (QoS).

BACKGROUND ART

In the following we describe some known methods used for the channel delay profile estimation in CDMA receivers. These methods can be divided in two different groups depending on the particular architecture employed. We can consider methods based on the Code Delayed Architecture (CDA) or methods based on the Data Delayed Architecture (DDA).

In a CDA delay profile estimator one replica of the PN sequence is generated at the receiver and directly correlated with the received data. During the subsequent correlation operations the phase of the PN sequence is cyclically changed in order to scan other positions (i.e. delays) of the receiving search window.

In a DDA delay profile estimator the phase (i.e. delay) of the received data is cyclically changed whereas the phase of the PN sequence is kept fixed. The shift of the received data is usually obtained, by storing the received signal samples in a delay line and cyclically taking the samples, for the correlation operation, from the different positions of the delay line.

In the description of the known methods the various signals are expressed in terms of complex envelope so that each signal is represented by the two components: in-phase (I) and in-quadrature (Q). The information sequence generated by the transmitter is represented with u(n) where n is the discrete time index related to the information symbol period $T_s$ $$u(n)=u(n \cdot T_s) n=0,1,2 \ldots$$

The PN code sequence S(k) is expressed as $$S(k)=S(k \cdot T_C)=S_I(k)+j \cdot S_Q(k) k=0,1,2,\ldots$$

where k is the discrete time index related to the chip period $T_C$. The PN sequence is periodic with a period of SF chips (SF is the Spreading Factor) and a different sequence is assigned to each user in order to minimise the cross-interference among the users sharing the same channel $$S(k)=S(k+SF) \forall k \geq 0$$

The information sequence u(n) is spread by means of the multiplication of each information symbol with the PN code sequence S(k), made by SF subsequent chips, as follows $$x(k)=x_I(k)+j \cdot x_Q(k)=u(k \text{div} SF) \cdot S(k)$$

As a consequence the chip period $T_C$ is SF times smaller than the symbol period $T_S$ and, after the spreading operation, the signal bandwidth of the information sequence is increased by a factor SP. The discrete time index n of the information sequence is expressed as a function of the discrete time index k of the chip sequence by means of the following expression $$n=k \text{div} SF$$

where k div SP is the integer part of the quotient between k and SF.

The signal x(k) is then filtered and transmitted over the propagation channel. In the particular case of a propagation channel with only one direct path between the transmitter and the receiver, the base-band signal arriving at the input of the Rake receiver, from the receiver front-end, is denoted as y(k) and it can be expressed as follows $$y(k)=x(k) \cdot c(k)+n(k)=u(k \text{div} SF) \cdot S(k) \cdot c(k)+n(k)$$

where $c(k)=c_I(k)+j \cdot c_Q(k)$ represents the distortion introduced by the propagation channel (due to fast fading and Doppler effect) and $n(k)=n_I(k)+j \cdot n_Q(k)$ represents the effect of thermal noise plus interference.

The channel delay profile is indicated with $h(l)=h_I(l)+j \cdot h_Q(l)$ where l is the variable spanning over the channel delay spread. We assume that the time spreading of the channel is limited to H chips before the strongest received signal replica and T chips after that replica. As a consequence the variable 1 spans in the range $$-H \leq 1 \leq T$$

where the value 1=0 corresponds to the time position of the strongest signal replica, which is usually taken as a reference for the synchronism of the receiver. Therefore, the receiving search window, where the Rake receiver is able to capture the energy of the received multi-path components, has a length of H+T+1 chips.

Finally we define the channel delay profile energy DP(1) as follows $$DP(1)=h_I^2(1)+h_Q^2(1)$$

Now we describe the following methods for the channel profile estimation:
  Serial correlator (CDA)
  Bank of correlators (CDA)
  Serial correlator (DDA)
  Matched filter (DDA)

The first method for the channel profile estimation is the serial correlator based on a CDA, whose structure is shown in FIG. 1.

The received signal y(k) is multiplied with the complex conjugate of the PN sequence S*(k−1) and the result is accumulated over an integration window of NC subsequent chips where, for example, NC can be equal to SP. After the integration, the energy of the channel profile is computed by taking the squared sum of the two signal components. The channel profile is computed according to the following equation $$h(1) = \sum_{i=k}^{k+NC-1} y(i) \cdot S^*(i-1)$$

The profile energy is then given by $$DP(1)=\{Re[h(1)]\}^2+\{Im[h(1)]\}^2$$

Each value of 1 ($-H \leq 1 \leq T$) corresponds to one particular delay of the code sequence and to one point of the channel profile. The computation of one point of the delay profile requires a time interval of NC chips and, in general, for a delay profile of H+T+1 points the time required for the profile computation is equal to $$t_{profile}=(H+T+1) \cdot NC[\text{chips}]$$

In order to reduce the time required for the profile computation it is possible to use a bank of serial correlators where each correlator is fed with a different replica of the PN code sequence. For example by using H+T+1 correlators the time required for the profile computation reduces to NC chips as all points of the profile are computed in parallel.

$$t_{profile}=NC[\text{chips}]$$

The block diagram of a bank of serial correlators based on the CDA solution is shown in FIG. 2. The different replicas S*(k+H), S*(k+H−1) . . . S*(k−T) of the PN code sequence are obtained by using a single code generator that writes the code values in a memory buffer. The different replicas of the PN code can be read, simultaneously, from the different positions of the memory buffer 2 as shown in FIG. 3.

The serial correlator DDA represents a dual solution with respect to the serial correlator CDA. In the DDA solution the phase of the PN code is kept fixed while the phase of the received data is changed. This is obtained by storing the received samples in a delay line 4 and cyclically taking the samples for the correlation operation from the different positions of the delay line. The block diagram of the serial correlator DDA is shown in FIG. 4.

The channel profile is computed according to the following equation $$h(1) = \sum_{i=k}^{k+NC-1} y(i+1) \cdot S^*(i)$$

while the profile energy is given by $$DP(1)=\{Re[h(1)]\}^2+\{Im[h(1)]\}^2$$

The time required for the computation of one point of the profile is the same of the CDA solution and it is equal to NC chips. As a consequence the time required for the computation of the complete profile over H+T+1 points is equal to $$t_{profile}=(H+T+1) \cdot NC[\text{chips}]$$

By using a matched filter it is possible to reduce the time required by the DDA solution for the channel delay profile computation. A matched filter is a filter whose frequency response is designed to exactly match the frequency spectrum of the input signal. In CDMA systems the matched filter is tuned to match a code sequence that is expected to be present within the digital samples entering in the receiver. For example, in the case of the UMTS system, a channel suitable for the uplink channel delay profile estimation is the DPCCH (Dedicated Physical Control Channel).

The matched filter is the dual solution with respect to the bank of serial correlators for the CDA. The filter is matched to the PN sequence and therefore the filter coefficients $f_{coeff}(j)$ are obtained by means of the following expression $$f_{coeff}(j)=S^*(NC-j) 1 \leq j \leq NC$$

The block diagram of the matched filter is shown in FIG. 5.

The matched filter detects the presence of the PN code sequence in the input data stream; the output of the matched filter can be viewed as a score value indicating the match with the code sequence. A high score value represents a good correlation of the input data with the PN code sequence.

The matched filter output is computed according to the following equation $$h(1) = \sum_{i=k}^{k+NC-1} y(i+1) \cdot S^*(i-k)$$

The profile energy is given by $$DP(1)=\{Re[h(1)]\}^2+\{Im[h(1)]\}^2$$

The time required by the matched filter to compute the channel delay profile is equal to the search window length, that is H+T+1 chips, plus (NC−1) chips necessary to fill the filter delay line with the incoming samples $$t_{profile}=H+T+1+(NC-1)[\text{chips}]$$

The matched filter (DDA) and the bank of correlators (CDA) offer faster path detection than other solutions but they present high complexity and power consumption.

The theory underlying the operations performed by a bank of correlators (CDA) or a matched filter (DDA) for the computation of the channel delay profile in a spread spectrum receiver is illustrated in R. L. Pickholtz, D. L. Shilling, L. B. Milstein, "Theory of Spread Spectrum Communications—A Tutorial", IEEE Transactions and Communications, Vol. COM-30, No. 5, May 1982.

The problem of reducing the complexity of the architecture of a matched filter is addressed in U.S. Pat. No. 5,715,276. This patent relates to a matched filter (DDA), for use as part of a spread spectrum receiver, wherein the filter length is broken into two halves of length N/2 each, where N is the number of taps on the matched filter.

Although the matched filter described in U.S. Pat. No. 5,715,276 requires fewer logic gates, compared to a classical matched filter the overall hardware implementation of the filter is however relevant.

It is likewise well known that the architecture of a Rake receiver always incorporates a memory buffer, for temporarily storing input data streams (DDA), or the locally generated PN code (CDA).

The architecture disclosed in WO 00/25437 is an example of a Rake receiver (DDA) architecture provided with an input memory buffer, implemented as a dual-port RAM. The I/Q sample pairs at the input of the Rake receiver are stored in the RAM memory through a first port, while a second port is used for accessing the same memory in read mode.

Another prior art Rake receiver architecture (DDA), incorporating an input memory buffer, is disclosed in H. Lasse, N. Jari, "A Flexible Rake receiver Architecture for WCDMA Mobile Terminals", Third IEEE Signal Processing Workshop on Signal Processing Advances in Wireless Communications, Taoyuan, Taiwan, Mar. 20-23, 2001.

Such architecture incorporates an input memory buffer, used for storing the I/Q sample pairs at the input of the Rake receiver, implemented as an input stream buffer which can be comprehended as a time-sliding window divided into three parts: a write window allowing writing to the buffer, a pre-window and a post-window allowing read accesses without overlapping with the write window. The read and write accesses are interleaved in time in order to avoid the need of concurrent memory accesses. A correlator engine reads the multipath samples from the stream buffer and performs the despreading of the multipath components sequentially.

Another prior art Rake receiver architecture (CDA), incorporating an input memory buffer for the different phases of the PN code sequence, is disclosed in U. Grob, A. L. Welti, E. Zollinger, R Kung and H. Kauffman "Microcellular Direct-Sequence Spread-Spectrum Radio System Using N-Path RAKE Receiver", IEEE Journal on Selected Areas in Communications, Vol. 8, June 1990.

The Applicant has tackled the problem of further reducing the overall complexity and silicon requirement of a channel delay profile estimation unit in a Rake receiver.

The Applicant observes that, in a Rake receiver, a RAM buffer is always required, independently on the choice of the receiver architecture. The RAM buffer is used to store the data arriving from the receiver front-end, in the case of a DDA architecture, or the data arriving from the Code Generator Circuit, in the case of a CDA architecture.

The Applicant has observed that, in the previously described technique making use of a matched filter (DDA), the delay line of the matched filter duplicates in part the function of the RAM buffer for storing the data arriving from the receiver front-end. As a matter of fact, both the delay line and the RAM buffer store the same data.

In a similar way the Applicant has observed that, in the previously described technique making use of a bank of correlators (CDA), the delay line, necessary for the generation of the different phases of the PN sequence, duplicates in part the function of the Rake receiver RAM buffer for storing the different PN code replicas. As a matter of fact, both the delay line and the RAM buffer store the same data.

In view of the above, it is an object of the invention to provide a method and a device for the estimation of the channel delay profile in a digital communication receiver, allowing to reduce the hardware complexity of the Rake receiver, reducing consequently the silicon area of the chip on which the system is integrated.

SUMMARY OF THE INVENTION

The Applicant has found that, in a Rake receiver with a DDA architecture, the input memory buffer, used to store the data arriving from the receiver front-end, can be used by a channel delay profile estimation unit as an input delay line. According to a first aspect of the invention, a basic correlator sequentially reads the data from the input memory buffer of the Rake receiver, correlates them with a re-generated user code and stores the result in an accumulation memory.

In a second aspect thereof, the present invention relates to a channel delay profile estimation unit for a Rake receiver with CDA architecture. The CDA architecture uses a memory buffer for storing the PN code values arriving from a Code Generator Circuit. A basic correlator sequentially reads the re-generated code elements from the memory buffer and correlates them with the received data, storing the results in an accumulation memory.

The Applicant has verified that the hardware complexity of a Rake receiver can be remarkably reduced, in relation to prior art architectures, and that a slightly increase in computation time is offset by the greatly reduced complexity.

DESCRIPTION OF PREFERRED EMBODIMENTS

Figure 1:
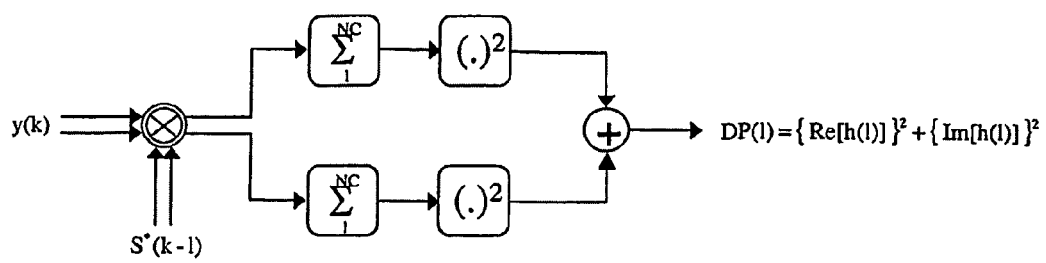
FIG. 1 is a block diagram of a serial correlator CDA according to the prior art.
Figure 2:
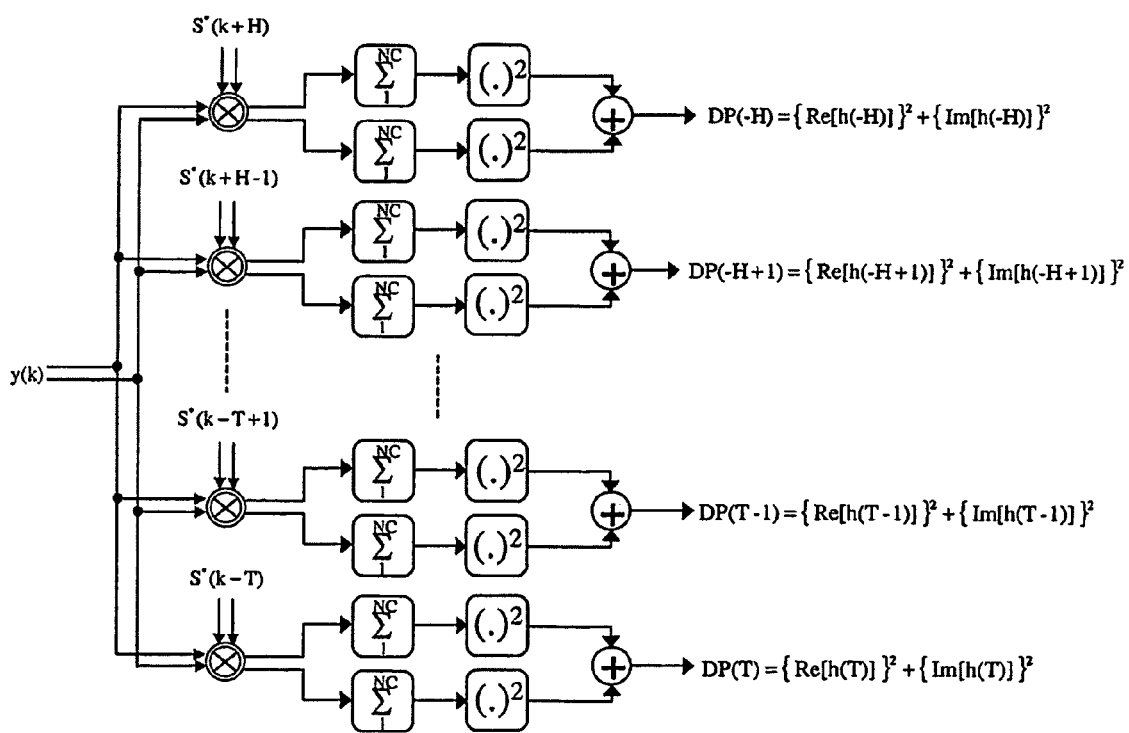
FIG. 2 is a block diagram of a bank of serial correlators CDA according to the prior art.
Figure 3:
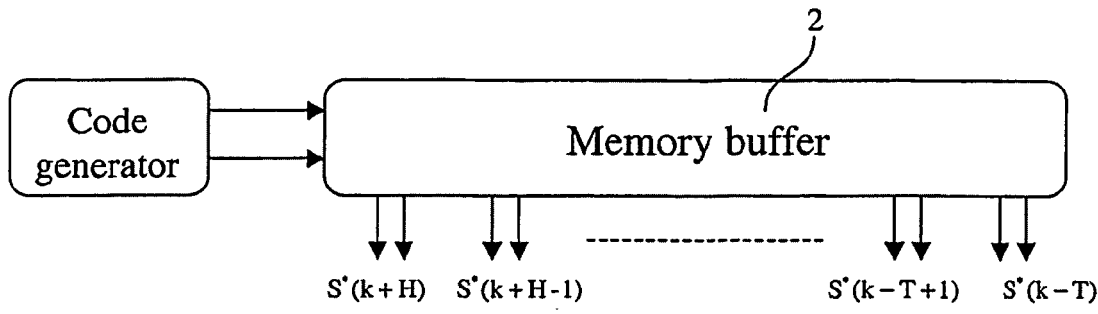
FIG. 3 describes a single PN code generator writing the PN code samples in a memory buffer, according to the prior art.
Figure 4:
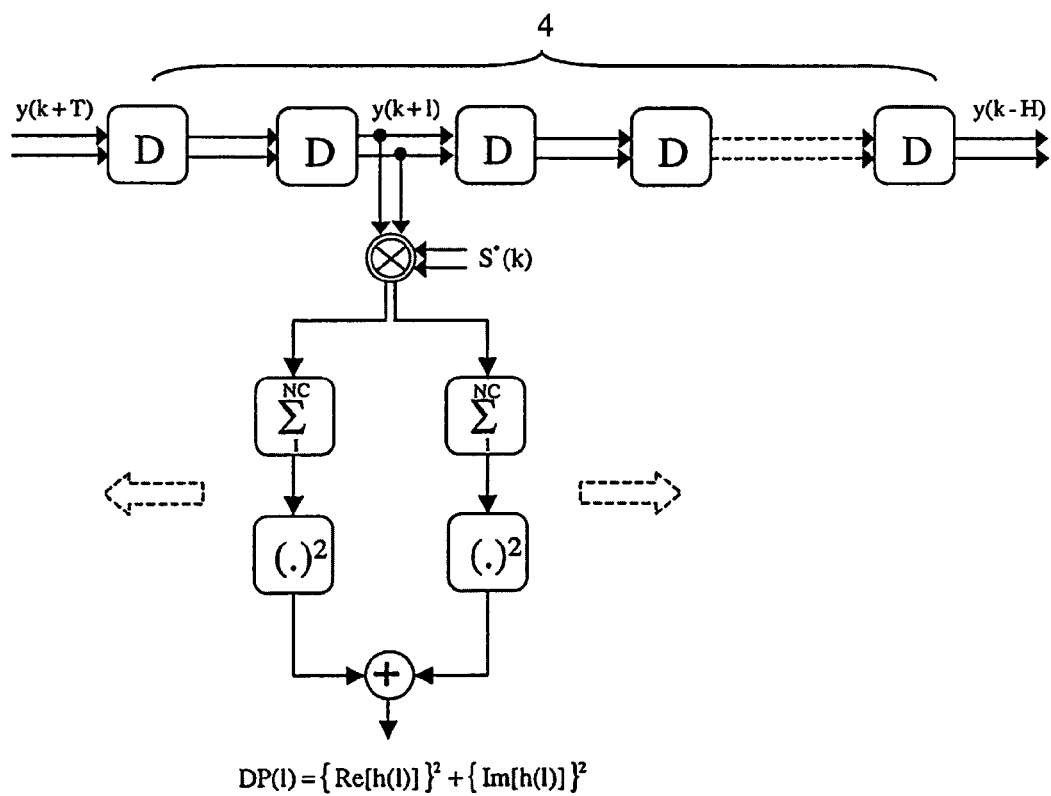
FIG. 4 is a block diagram of a serial correlator for DDA according to the prior art.
Figure 5:
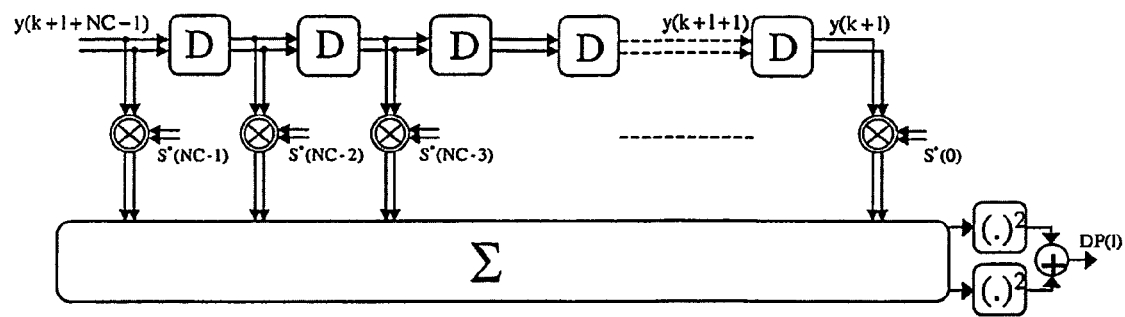
FIG. 5 is a block diagram of a matched filter correlator DDA according to the prior art.
Figure 6:
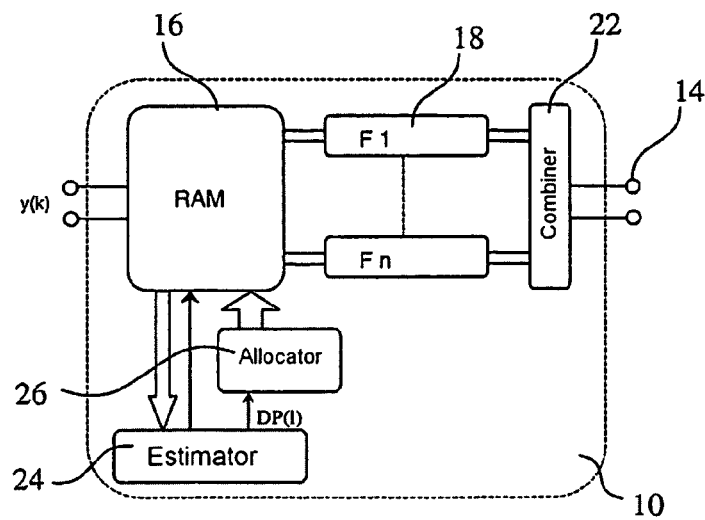
FIG. 6 is a block diagram of a DDA architecture Rake receiver realized according to a first aspect of the present invention.

The FIG. 6 shows a block diagram of a digital communication receiver, realized according to a first aspect of the present invention (DDA architecture). A Rake receiver 10 receives an input signal y(k), sampled at N times the chip frequency $F_C$, from a receiver front end, not shown in figure.

The input signal y(k) feeds a Random Access Memory 16, with size equal to the channel delay spread of H+T+1 chips, and a delay profile estimation unit 24.

The delay profile estimation unit 24 computes the time delays and amplitudes of each received multipath component and it provides, as output, a channel profile energy DP(1), where 1 is the variable spanning the channel delay spread.

From a functional point of view the Rake receiver 10 is a modular device made by a plurality of independent receiving units, named fingers 18, each tuned to a different replica of the transmitted signal. Each finger F1 . . . Fn performs the operations of descrambling, despreading and integration on the chips of the incoming signal. In order to allocate the necessary number of fingers, the delay profile estimation unit 24 regularly computes the channel delay profile. The main peaks of the delay profile are assigned to the rake fingers 18. Since the measured delay profile is affected by noise, interference and fading, a suitable module 26, usually referred to as Finger Allocation Unit, compensates these impairments and selects the optimal positions and number of assigned fingers.

The outputs of the fingers 18 are combined by means of a combiner 22, whose output 14 can be connected to subsequent modules such as deinterleavers and channel decoders, not shown in FIG. 6.

Figure 7:
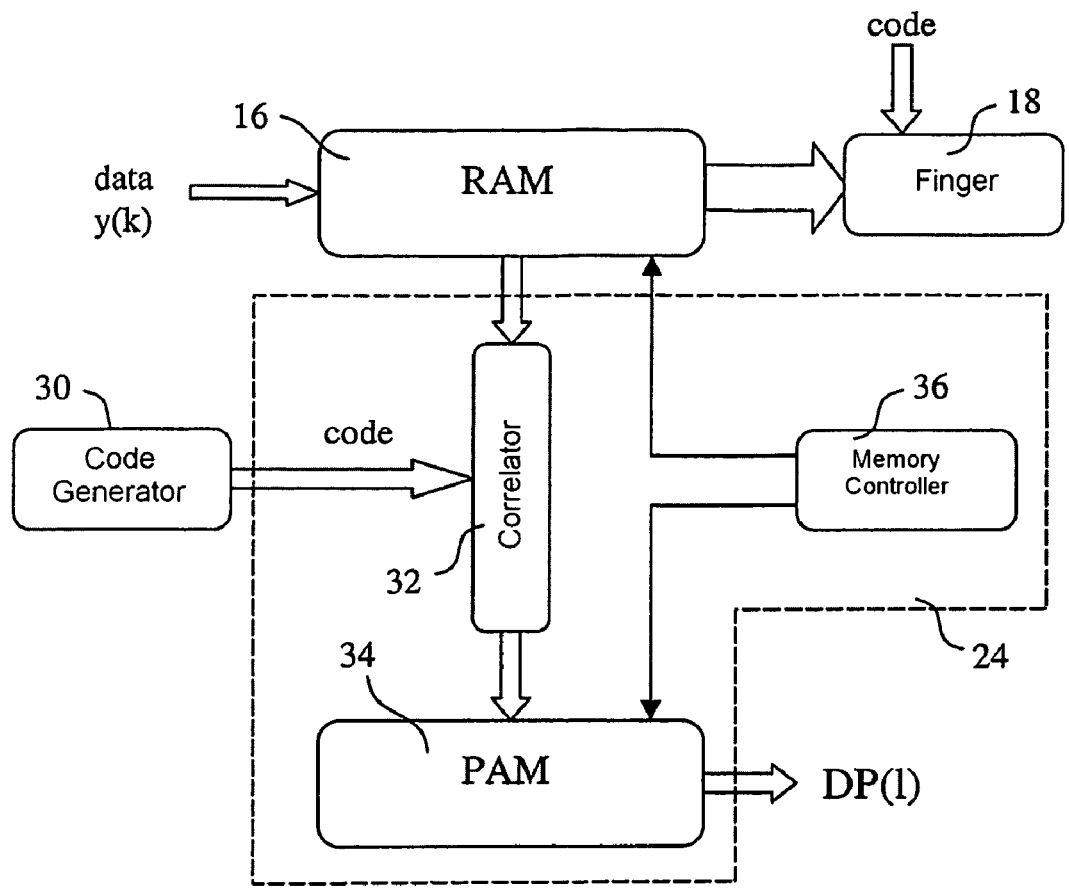
FIG. 7 shows a delay profile estimation unit used in the Rake receiver of FIG. 6.

A delay profile estimation unit 24, realized according to a first aspect of the invention as a serial correlator DDA, is shown in detail in FIG. 7. A basic correlator 32, whose structure will be illustrated in detail in the following with reference to FIG. 8, reads the data from the input memory buffer (RAM) 16 of the Rake receiver and correlates them with the re-generated user code provided by the code generator unit 30. The result of the correlation operation, that is the channel profile energy DP(1), is stored in a memory, for example a RAM memory, named Profile Accumulation Memory (PAM) 34.

The input memory buffer (RAM) 16 and the Profile Accumulation Memory (PAM) 34 are both addressed by a memory controller 36, so that the reading and writing operations of the basic correlator 32 in memories 16 and 34 are handled by the memory controller.

For example, the samples of the input signal y(k) can be written and read in the memory buffer 16 as in a circular buffer. In particular, the writing and reading operations can be executed through separate pointers incremented modulo the buffer size H+T+1.

Every NC chips, where NC is equal to the integration window size, the memory controller 36 updates the reading pointer in the memory buffer 16 in order to compute the next point of the channel delay profile energy.

When the basic correlator 32 has processed the first NC chips, a first point of the channel profile energy DP(k) is obtained and stored into the PAM memory 34. After that, the basic correlator 32 changes its reading and writing position in the memories 16 and 34 respectively and, by processing the following NC chips, it computes a second point DP(k+1) of the channel profile energy.

A straightforward method to improve the reliability of the delay profile estimation is to perform the non-coherent accumulation of several delay profiles. The non-coherent detection removes the phase rotation introduced by the channel and allows the sum of the energy of various delay profiles obtained at different time instants. The non-coherent accumulation can be expressed in formulas as follows $$DP_{acc}(1) = \sum_{i=1}^{N_{acc}} DP_i(1) \forall\, 1$$

where $N_{acc}$ is the number of accumulations, $DP_{acc}$ is the profile after non-coherent accumulation and $DP_i$ is the $i^{th}$ channel profile energy.

In the absence of accumulations, the delay profile estimation unit 24 computes a delay profile of H+T+1 points, in a time equal to NC×(H+T+1) chips. If we consider, for instance, a delay profile of 128 points and an integration window of NC of 256, the time required by the serial correlator for its computation is equal to 32768 chips that, for example, correspond to about 13 slots for the FDD mode of the UMTS system. With the accumulation procedure necessary for improving the reliability of the estimated delay profile, the computation time becomes $N_{acc}$ times larger. Moreover, if the channel delay profile is oversampled with n samples per chip, the computation time becomes n times larger as the number of points to be computed is n×(H+T+1) for each profile.

In order to reduce the computation time necessary for the estimation of a delay profile it is possible to time multiplex the basic correlator 32 at a multiple of the chip frequency $F_C$. For example, with a basic correlator multiplexed at L times the chip frequency $F_C$, a delay profile of H+T+1 chips, oversampled with n samples per chip and accumulated $N_{acc}$ times can be computed in a time equal to $$t_{profile} = N_{acc} \cdot n \cdot \frac{NC \cdot (H+T+1)}{L} [\text{chips}]$$

On the other hand, the time multiplexing of the basic correlator increases the access frequency to the memory buffer 16.

Figure 8:
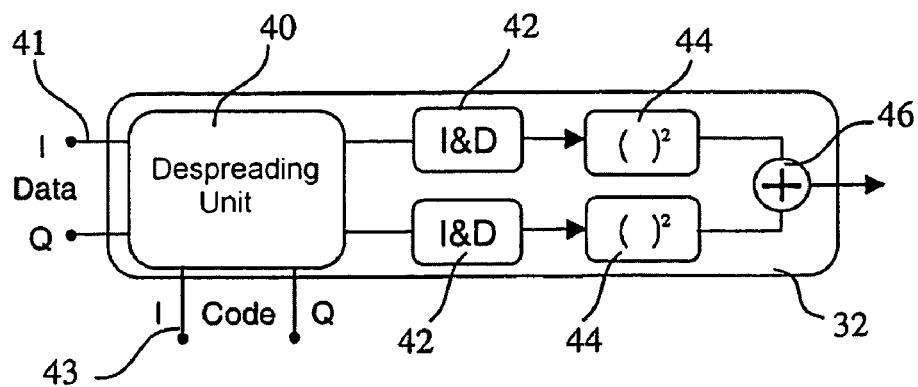
FIG. 8 shows the detailed structure of a basic correlator used in a Rake receiver realized according to the present invention.

The architecture of the basic correlator 32 is shown in detail in the block diagram of FIG. 8. The basic correlator 32 has a first input (Data) receiving the complex sequence (I and Q components) of NC chips corresponding to the received signal y(k), and a second input (Code) receiving the complex PN code sequence of NC chips, generated by the code generator unit 30 shown in FIG. 7.

The basic correlator 32 includes, in the particular case of a UMTS receiver operating in FDD mode, a descrambling and despreading unit 40, for the multiplication between the data and the complex conjugate of the re-generated user codes, two Integrate and Dump units 42 performing the sum of the NC partial products at the output of the descrambling and despreading unit, and two squaring units 44 for computing the energy of the received symbols at the output of the Integrate and Dump units. The energies of the two signal components are then combined by means of the adder 46.

The device for the estimation of the channel delay profile previously described operates according to a method comprising the following steps:

a) sequentially reading a first plurality of samples of the input signal y(k) from the memory buffer 16;

b) correlating said plurality of samples of said input signal with the re-generated user code for generating a first value of the channel delay profile energy DP(k);

c) updating the reading position on the input memory buffer 16 for reading a further plurality of samples of the input signal y(k);

d) correlating said further plurality of samples of said input signal with the re-generated user code for generating a further value of the channel delay profile energy DP(k+1), the generated value of the channel delay profile energy DP(k+1) being stored in a profile accumulation memory 34;

e) repeating the steps c) to d) in order to compute all the points of the channel delay profile.

Figure 9:
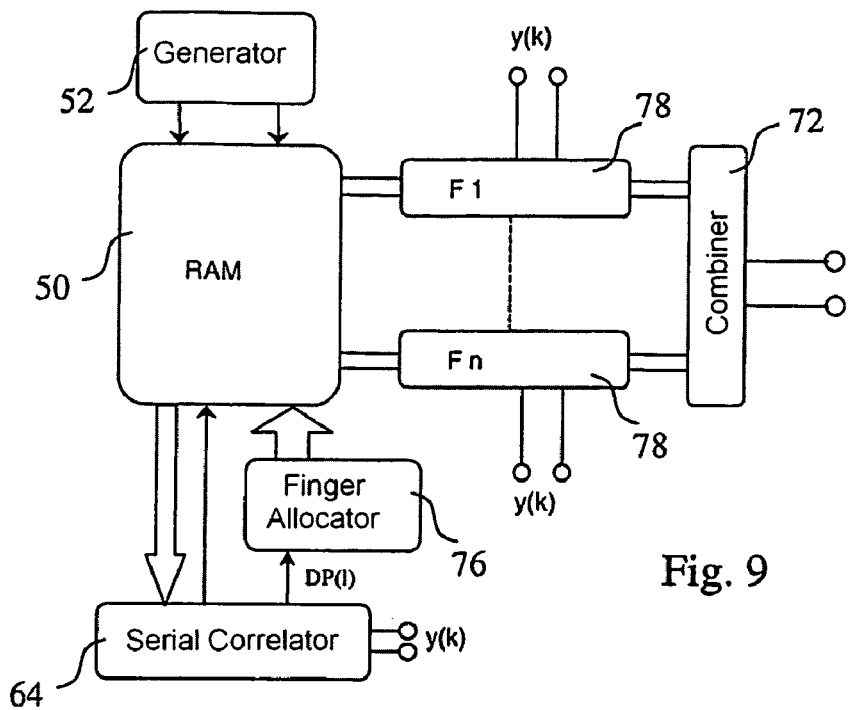
FIG. 9 is a block diagram of a Rake receiver realized according to a second aspect of the present invention.

With reference to FIG. 9, a digital communication receiver, realized according to a second aspect of the present invention, will now be described. The block diagram of FIG. 9 illustrates a Rake receiver based on a Code Delayed Architecture (CDA), employing a delay profile estimation unit, or serial correlator CDA, 64, shown in detail in FIG. 10. Since the measured delay profile is affected by noise, interference and fading, a suitable module 76, usually referred to as Finger Allocation Unit, compensates these impairments and selects the optimal positions and number of assigned fingers.

A Rake receiver implemented with a Code Delayed Architecture (CDA) uses a RAM memory buffer 50 to store the complex conjugate of the PN code sequence, generated by the code generator unit 52, for a time interval equal to the entire channel delay spread of H+T+1 chips. The received signal y(k) is directly multiplied in every finger 78 with one code replica obtained through the accesses to the different locations of the RAM memory as shown in FIG. 9. The output of the fingers 78 are combined by means of a combiner 72, whose output can be connected to subsequent modules such as interleavers and channel decoders, not shown in FIG. 9. Similarly to the DDA architecture, the reading and writing operations in the memory buffer 50 can be for example organised as a circular buffer.

Figure 10:
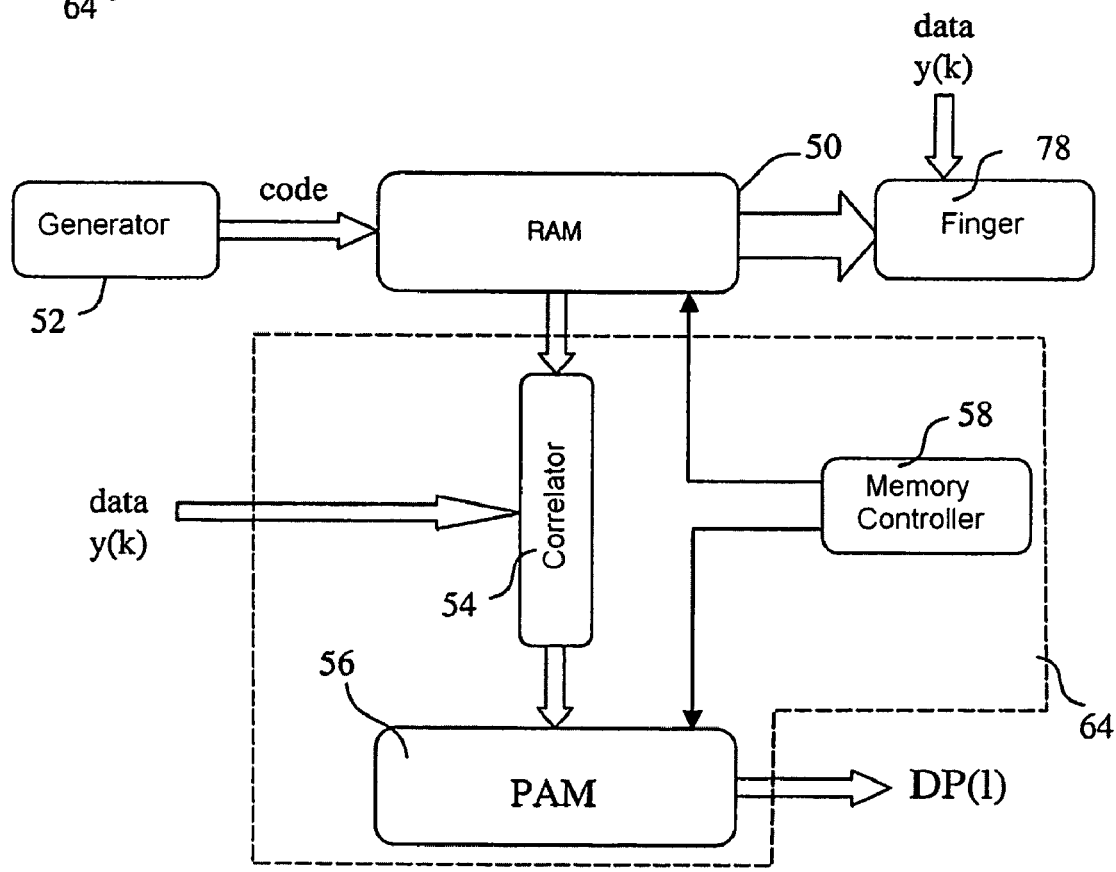
FIG. 10 shows a delay profile estimation unit used in the Rake receiver of FIG. 9.

In the delay profile estimation unit shown in FIG. 10, the re-generated user code sequence, generated by the code generator unit 52, is stored in a RAM memory buffer 50 of the receiver, while the received data y(k) feed directly the basic correlator 54.

The basic correlator 54 reads from the RAM memory buffer 50 a number of subsequent PN code elements equal to NC and correlates them with the received data y(k), generating one point of the delay profile. The delay profile energy values are stored in the profile accumulation memory PAM 56, likewise in the DDA solution previously illustrated.

After that, every NC chips, the basic correlator 54 updates its reading position in the RAM memory buffer 50 and repeats a correlation operation computing the next point of the channel delay profile The addressing operations of the input memory buffer (RAM) 50 and the Profile Accumulation Memory (PAM) 56 are handled by a memory controller 58.

As explained above with reference to the DDA architecture, the time multiplexing of the basic correlator 54 reduces the computation time of the delay profile.

The device for the estimation of the channel delay profile previously described, with reference to the CDA architecture, operates according to a method comprising the following steps:

a) sequentially reading a first plurality of samples of the re-generated user code from the memory buffer 50;

b) correlating said plurality of samples of said re-generated user code with an input signal y(k) for generating a first value of the channel delay profile energy DP(k);

c) updating the reading position on the input memory buffer 50 for reading a further plurality of samples of the re-generated user code;

d) correlating said further plurality of samples of said re-generated user code with the input signal y(k) for generating a further value of the channel delay profile energy DP(k+1), the generated value of the channel delay profile energy DP(k+1) being stored in a profile accumulation memory 56;

e) repeating the steps c) to d) in order to compute all the points of the channel delay profile.

A delay profile estimation unit realized according to the present invention either implemented in a DDA architecture or in a CDA architecture rake receiver, offers several advantages over the prior art, in particular with respect to a matched filter.

While the delay line of a matched filter must be implemented with a cascade of flip-flops, the serial correlator used in the delay profile estimation unit makes use of a RAM memory buffer, which is already present in a rake receiver architecture. Moreover, the serial correlator, unlike the matched filter, preserves the receiver modularity. In fact the serial correlator, being dedicated to a single user, can be viewed as a sub-system internal to the Rake receiver. Any communication burden, like for example the updating of the matched filter coefficients, due to the need of sharing the filter among several users, is avoided.

The invention claimed is:

1. A spread spectrum digital communication receiver, the receiver comprising:

an input memory buffer for storing samples of an input signal;

a code generator circuit for generating a regenerated user code;

a device for the estimation of a channel delay profile energy, for computing the time delays and amplitudes of each received multi-path component of said input signal;

a plurality of fingers; and a finger allocation unit for processing said channel delay profile energy in order to select the strongest multi-path components of said input signal and allocate them to said fingers; wherein the device for the estimation of a channel delay profile energy comprises:

a basic correlator having a first input for sequentially reading from a memory location of said input memory buffer a plurality of samples of said input signal, a second input for receiving from said code generator circuit a regenerated user code, and an output terminal for generating, by means of a correlation operation between said plurality of samples of said input signal and said regenerated user code, a value of said channel delay profile energy; and a memory controller circuit for addressing said input memory buffer so that said first input of said basic correlator is successively fed with the content of the memory locations of said memory buffer, each addressing operation corresponding to a new correlation operation of said basic correlator for the computation of a new value of said channel delay profile energy.

2. The receiver according to claim 1, wherein the values of said channel delay profile energy are progressively stored in a profile accumulation memory.

3. The receiver according to claim 2, wherein said memory controller circuit addresses said profile accumulation memory so that the reading operations of said basic correlator from said input memory buffer and the writing operations into said profile accumulation memory are handled by the memory controller circuit.

4. The receiver according to claim 3, wherein said memory controller circuit updates the addressing of said input memory buffer and said profile accumulation memory every NC chips, where NC is equal to the integration window size, changing the reading and writing positions of said basic correlator.

5. The receiver according to claim 3, wherein, when the last memory location of both said input memory buffer and said profile accumulation memory is reached, the addressing restarts circularly on a first location of both memories.

6. The receiver according to claim 3, wherein said basic correlator is time multiplexed, at a multiple of the chip frequency, between a plurality of memory locations of said input memory buffer and of said profile accumulation memory.

7. The receiver according to claim 2, wherein said delay profile energy is obtained by accumulating the energies of several delay profiles.

8. A spread spectrum digital communication receiver, the receiver comprising:
   a code generator circuit for generating a regenerated user code;
   a memory buffer for storing samples of said regenerated user code;
   a device for the estimation of a channel delay profile energy, for computing the time delays and amplitudes of each received multi-path component of an input signal received by said receiver;
   a plurality of fingers; and
   a finger allocation unit for processing said channel delay profile energy in order to select the strongest multi-path components of said input signal and allocate them to said fingers; wherein the device for the estimation of a channel delay profile energy comprises:
   a basic correlator having a first input for receiving said input signal and a second input for sequentially reading from a memory location of said memory buffer a plurality of samples of said regenerated user code, and an output terminal for generating, by means of a correlation operation between said input signal and said plurality of samples of said regenerated user code, a value of said channel delay profile energy; and
   a memory controller circuit for addressing said memory buffer so that said second input of said basic correlator is successively fed with the content of the memory locations of said memory buffer, each addressing operation corresponding to a new correlation operation of said basic correlator for the computation of a new value of said channel delay profile energy.

9. The receiver according to claim 8, wherein the values of said channel delay profile energy are progressively stored in a profile accumulation memory.

10. The receiver according to claim 9, wherein said memory controller circuit addresses said profile accumulation memory so that the reading operations of said basic correlator from said memory buffer and the writing operations into said profile accumulation memory are handled by the memory controller circuit.

11. The receiver according to claim 10, wherein said memory controller circuit updates the addressing of said memory buffer and said profile accumulation memory every NC chips, where NC is the integration window size, changing the reading and writing positions of said basic correlator.

12. The receiver according to claim 10, wherein, when the last memory location of both said memory buffer and said profile accumulation memory is reached, the addressing restarts circularly on a first location of both memories.

13. The receiver according to claim 10, wherein said basic correlator is time multiplexed, at a multiple of the chip frequency, between a plurality of memory locations of said memory buffer and of said profile accumulation memory.

14. The receiver according to claim 10, wherein said delay profile energy is obtained by accumulating the energies of several delay profiles.

15. A method for the estimation of the channel delay profile energy in a spread spectrum digital communication receiver of the type comprising a code generator circuit for generating a regenerated user code and a memory buffer for storing samples of said regenerated user code and having a first output port for feeding a plurality of fingers with a corresponding plurality of samples of the regenerated user code and a second output port, comprising the steps of:
   a) sequentially reading a first plurality of samples of the regenerated user code from the second output of said memory buffer;
   b) correlating said plurality of samples of said regenerated user code with an input signal y(k) for generating a first value of the channel delay profile energy;
   c) updating the reading position on said memory buffer every NC chips where NC is the integration window size for reading a further plurality of samples of the regenerated user code;
   d) correlating said further plurality of samples of said regenerated user code with said input signal for generating a further value of the channel delay profile energy, said generated value of the channel delay profile energy being stored in a profile accumulation memory; and
   e) repeating the steps c) to d) in order to compute all the values of the channel delay profile.

16. The method according to claim 15, further comprising the step of storing each generated value of said channel delay profile energy in said profile accumulation memory.

* * * * *